Dec. 8, 1970   J. B. KENNEDY ET AL   3,545,282

ACCELEROMETER

Filed April 14, 1965

INVENTORS.
JOE BARTLETT KENNEDY,
THOMAS RHYS EDMONDS,
BY THEIR ATTORNEYS
Spensley & Horn.

United States Patent Office 3,545,282
Patented Dec. 8, 1970

3,545,282
ACCELEROMETER
Joe Bartlett Kennedy, Saugus, and Thomas Rhys Edmonds, Woodland Hills, Calif., assignors to Conductron Corporation, Ann Arbor, Mich., a corporation of Delaware
Filed Apr. 14, 1965, Ser. No. 447,993
Int. Cl. G01p 15/08
U.S. Cl. 73—514                              6 Claims

ABSTRACT OF THE DISCLOSURE

A pendulous acceleration sensor having a substantially monolithic structure is disclosed. The sensor is capable of sensing acceleration or other body characteristics along two axes. The pendulum is supported by an elastomer mount which enables movement equally about the two axes and thereby provides a rugged sensor with no articulate moving parts.

---

This invention relates to a pendulum and in particular to a pendulous acceleration sensor having a substantially monolithic structure.

Prior art sensors, such as accelerometers, have usually required a plurality of devices to sense certain body motion characteristics, such as acceleration, along two axes. The use of two devices complicates the mounting problem, and usually requires greater weight and size considerations. In addition, cost is greatly increased. The devices used in such prior art arrangements have generally employed torsion springs or mechanical bearings for mounting. These mountings are delicate and cannot withstand the operational and nonoperational demands of many current applications, such as accelerometers employed in torpedo and missile controls systems.

The invented sensor and pendulum overcomes the prior art shortcomings by providing a single sensor that is capable of sensing acceleration or other body characteristics along two axes. Thus, what was in the prior art performed by two fragile sensors may now be accomplished by one rugged device. The sensor employed utilizes a pendulum cooperating with a two-axis pickoff. The pendulum is supported by an elastomer which enables movement equally about two axes. The pendulum mounted in this manner and cooperating with a two-axis pickoff forms a rugged, simple, low cost structure which is substantially monolithic with no articulate moving parts that may be either damaged or deformed out of calibration. High reliability is a fallout from such a simple arrangement.

Briefly, the structure employed to accomplish the above advantages comprises: an optical pickoff means for transmitting radiant energy, for receiving the radiant energy reflected from a reflecting surface and for generating an electrical signal representative of the alteration of the radiant energy imposed by an angular displacement of a reflecting surface; a pendulum having a reflecting surface, a mounting surface bounding the reflecting surface; and a pendulous mass extending from the mounting surface; a support surface for supporting the pendulum to move in an arcuate path; and, an elastomer for mounting the mounting surface on the support surface to enable the pendulous mass to move in an arcuate manner, whereby a sensor having no moving parts is formed.

Figure 1:
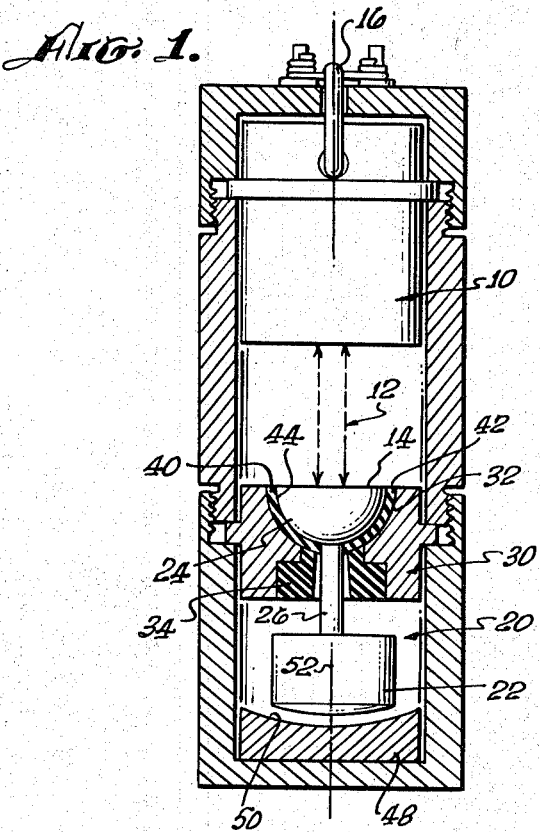
Figure 2:
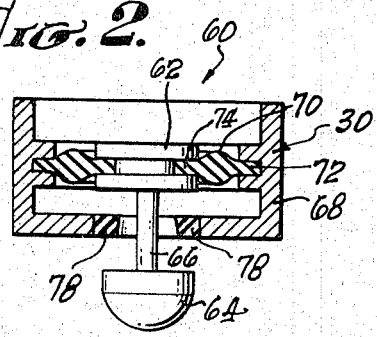

The above structure and advantages can be readily understood by reference to the detail specification which follows along with the drawings, wherein FIG. 1 is a cross-sectional elevation view of one embodiment of the invented sensor and pendulum and FIG. 2 is a cross-sectional elevation view of another embodiment of the invented sensor and pendulum.

Referring to FIG. 1, the invented sensor comprises a pickoff means 10 for sensing the angular orientation of a reference surface 14 about the two axes perpendicular to the axis of the pendulum 20; and a supporting pickoff means 10 for transmitting radiant energy 12, for receiving reflections of this radiant energy from a reference or reflecting surface 14 and for supplying an output signal via leads 16 representative of the alteration or angularity of the mirror 14 as imparted by the reflected radiant energy; a pendulum 20; and a supporting structure 30. More specifically, the pickoff means 10 senses the angular orientation of reference surface 14 about the two axes perpendicular to the axis of the pendulum 20. This pickoff means 10 may take the form of an optical pickoff having a light source and lenses for transmitting radiant energy 12, and photocells for sensing angular displacements by receiving reflections of this radiant energy from the reflecting surface 14 to provide an output signal via leads 16 as is well known in the art. In particular, the optical pickoff may take the form of a gallium arsenide laser diode cooperating with four photocells arranged in a cruciform and forming an aperture at its center. Such an arrangement is described in detail in U.S. Patent application Ser. No. 448,012, filed by Thomas Edmonds and assigned to the assignee of this application. The portion of that application relating to the optical pickoff is incorporated in this specification by reference thereto. It should be understood that it is consistent with the broad aspects of this invention to employ other than optical pickoffs. For example, capacitive, inductive, or magnetic pickoffs may be employed.

The radiant energy transmitted by optical pickoff 10 is directed at a reflecting surface 14 which may form an integral part of the pendulum 20. The pendulum 20 comprises a pendulous mass 22 which extends downwardly from mounting surface 24. The mounting surface 24 takes the form of a hemispherical surface which bounds the mirror surface 14. The pendulous mass 22 is attached to hemispherical surface 24 by a rod 26.

The supporting structure 30 is located in the proximity of hemispherical surface 24 and preferably includes a mating support surface 32 that may conform to the contour of mounting surface 24. The mating support surface 32 preferably takes the form of a female hemispherical surface that sometimes has a larger diameter than the hemispherical surface 24, though this may vary depending on the operating properties desired. A pendulum stop 34 is attached to support 30 and limits the motion of rod 26 to a predetermined angular travel. The limit of the movement of the pendulum to a given range of operation minimizes the possibility of any damage in operation, shipping, handling or storage.

The matching hemispherical surface 24 and 32 are permanently bonded by a formed structure of suitable elastomer 40 that enables the pendulum 20 to move in an acurate manner about any axis perpendicular to the pendulum axis. In particular, elastomer 40 is sandwiched between the surfaces 24 and 32, which are supported by the elastomer shell 40. The elastomer shell has an outside surface 42 which is substantially identical with the diameter of surface 32 and it has an inside diameter defining surface 44 which is substantially identical with the diameter surface 24. The particular elastomer employed should have a recovery time no greater than the period of the pendulum's natural frequency in order to avoid large transients. The elastomer should have force-deflation properties which experience little change with changing temperature. It should also have a relatively low strain sensitivity. The phenomenon of strain sensitivity is effectively a description of the non-linear nature of the elastice stress-strain property. The force-deflection property of the elastomer support is a function of both the stress-strain property of the material and the mounting geometry. Thus, by careful selection of the elastomer cross section and mounting geometry the non-linearity of the material can be minimized and an essentially linear support media fabricated which minimizes strain sensitivity. The elastomers which most ideally meet these requirements presently are the natural rubber and silicon rubber materials. It should be understood that the term elastomer includes any of the various classes of elastomers such as butadiene-styrene, butadiene-acrylonitride, chloroprene, butyl, urethane, polysulfide, viton, fluorinated acrylic, and others, as well as other resilient bulk materials which facilitate two axis movement.

In some applications it may be desirable to include an external damping means for minimizing or controlling the rebound of the elastomer. A typical damping means that may be included is magnetic damping ring 48 mounted adjacent one end of pendulum 20 and having a surface 50. Surface 50 is removed from the end of pendulum 20 but closely conforms to the contour of the end of the pendulum such that it may be regarded as a female and mating surface for the end of the pendulum. By incorporating such an external damping means it is possible to employ an elastomer having a very fast recovery time with little inherent damping, the damping being provided by the external damping means. In certain applications it may be unnecessary to incorporate such external damping means as the inherent damping of the elastomer may be sufficient for the particular application. In other applications it may be desirable to hermetically seal the sensor and include a damping fluid to provide the necessary damping. Other alternate damping means may take the form of other materials inserted in the elastomer bulk or inserted in apertures formed in the elastomer or by geometrically shaping the elastomer. These various damping means may be employed alone or in various combinations.

In operation, radiant energy 12 is transmitted by the optical pickoff 10 to the reflecting surface 14. When the body to which the sensor is mounted experiences an acceleration, the pendulum 20 is free to move in two directions perpendicular to the pendulum axis 52, that is the X and Z axis. As a result of the movement of pendulum 20, substantially pure shear forces are exerted on elastomer 40 between the surfaces 24 and 32 and the reflecting surface 14 is tilted. The tilting reflecting surface 14 alters the distribution of the radiant energy 12 received by the photosensitive detectors of optical pickoff 10. As a result of the alteration of the distribution of the reflected radiant energy 12, the photocells will supply output signals to leads 16 which are representative of the angularity of reflecting surface 14 and consequently of the displacement of pendulum 20. The displacement by well known dynamic relationships may be converted into velocity and acceleration data.

From the above description of structural features and operations it can be seen that a rugged, compact, simple, reliable sensor has been provided. This sensor is capable of sensing characteristics such as displacement, velocity and acceleration, and other similar characteristics along two axes. The arrangement is particularly useful in extreme environments such as experienced by missile, weapon and space systems.

Another embodiment of the invention is shown in FIG. 2. This embodiment of the invention employs a pendulum 60 having a reference or reflecting surface 62; a pendulous mass 64 connected to the reference surface 62 by the member 66. The pendulum is supported in a housing 68 by an elastomer support 70 which takes the form of a ring having a cross-section which will produce linearity in the deflection versus acceleration characteristic of the sensor. The elastomer 70 has one portion 72 held in housing 68 and another portion 74 in supporting contact with pendulum 60. The housing 68 contains a ring 78 which limits the movement of pendulum 60 in the same manner that insert 34 of the embodiment shown in FIG. 1 limits the movement of the pendulum shown therein. This embodiment of the invention has similar performance characteristics and possibilities as the one shown in FIG. 1 with the exception that the elastomer support is not subjected to only shear forces but also experiences stretching.

Although this invention has been disclosed and illustrated with reference to particular applications and mechanizations, the principles involved are susceptible of numerous other applications and configurations which will be apparent to persons skilled in the art. The invention is, therefore, to be limited only as indicated by the scope of the appended claims.

What is claimed is:
 1. A force sensing device comprising:
   an optical pickoff means for transmitting radiant energy, for receiving said radiant energy reflected from a reflecting surface and for generating an electrical signal related to the angularity of the reflected radiant energy which is imposed by a reflecting surface;
   a pendulum having a reflecting surface, a mounting surface bounding said reflecting surface, and a pendulous mass depending from said mounting surface, said reflecting surface in cooperative relation with said optical pickoff means;
   a support surface for supporting said pendulum to move in an arcuate path; and,
   an elastomer for mounting said mounting surface on said supporting surface to enable said pendulous mass to move in an arcuate manner, said elastomer sandwiched between said mounting surface and said supporting surface.
 2. The structure recited in claim 1 wherein said mounting surface is in the form of a groove in said pendulous, said support surface is in the form of a support member having a groove therein and said elastomer has one portion sandwiched between said groove in said mounting surface and another portion sandwiched between said groove in said support member.
 3. A force sensing device comprising:
   a solid state optical pickoff means for transmitting radiant energy, for receiving said radiant energy reflected from a reflecting surface and for generating an electrical signal related to the angularity imposed on said radiant energy by a reflecting surface;
   a pendulum having a reflecting surface optically coupled to said optical pickoff means, a mounting surface bounding said reflecting surface and having at least in part a spherical configuration, and a pendulous mass depending from said mounting surface;
   a support surface for supporting said pendulum to move in an arcuate path, at least a portion of said support surface having a spherical surface conforming to the contour of said mounting surface; and,
   an elastomer for mounting said pendulum on said support surface to move in an arcuate manner, said elastomer located intermediate said mounting surface and said support surface.
 4. The structure recited in claim 3 wherein said support surface and said mounting surface are hemispheric surfaces having a mating configuration, and said elastomer is a shell sandwiched between said mounting surface and said support surface, whereby any movement of said pendulous mass causes primarily shear forces.
 5. The structure recited in claim 4 wherein said reflecting surface is a mirrored surface normally perpendicular to the radiant energy transmitted by said optical pickoff means and adapted to tilt when said pendulous mass is displaced in an arcuate manner.
 6. The structure defined in claim 5 wherein said optical pickoff means generates an electrical signal representa- tive of movement of the reflecting surface about two axes, and said reflecting surface of said pendulum is adapted to tilt about two axes, contacting a substantial portion of said mounting surface and said supporting surface, whereby a monolithic pendulum assembly is formed.

References Cited

UNITED STATES PATENTS

| 1,919,332 | 7/1933 | Jones | 33—205.5 |
| 2,154,678 | 4/1939 | Hawthorne et al. | 33—215.3 |
| 2,881,276 | 4/1959 | Mintz et al. | 73—514X |
| 3,023,626 | 3/1962 | Bonnell | 73—517 |
| 3,272,016 | 9/1966 | Mullins | 73—517 |

FOREIGN PATENTS

| 5,132 | 12/1914 | Great Britain | 137—45 |
| 40,353 | 1957 | Poland | 346—7 |

JAMES J. GILL, Primary Examiner